United States Patent [19]

Sawano

[11] Patent Number: 4,591,257

[45] Date of Patent: May 27, 1986

[54] AUTOMATIC FOCUSING CAMERA

[75] Inventor: Hiroshi Sawano, Hachioji, Japan

[73] Assignee: Konishiroku Photo Industry Co., Ltd., Tokyo, Japan

[21] Appl. No.: 579,020

[22] Filed: Feb. 10, 1984

[30] Foreign Application Priority Data

Feb. 14, 1983 [JP] Japan .............................. 58-20637[U]

[51] Int. Cl.$^4$ ............................................... G03B 3/00
[52] U.S. Cl. ................................................... 354/403
[58] Field of Search ......................................... 354/403

[56] References Cited

U.S. PATENT DOCUMENTS

| 4,367,934 | 1/1983 | Matsui | 354/403 |
| 4,415,245 | 11/1983 | Harvey | 354/403 |
| 4,432,621 | 2/1984 | Suzuki et al. | 354/403 |
| 4,444,477 | 4/1984 | Tamura | 354/403 |

Primary Examiner—Russell E. Adams
Attorney, Agent, or Firm—Jordan B. Bierman

[57] ABSTRACT

This invention relates to an automatic focusing camera having an optical viewfinder, an optical distance measuring system and an optical photographic taking lens system arranged separate from one another. A slidable protector is provided which covers the optical openings of the taking lens system and the distance measuring system in one position, and uncovers the optical openings in a second position.

10 Claims, 14 Drawing Figures

AUTOMATIC FOCUSING CAMERA

BACKGROUND OF THE INVENTION

1. Field of the Invention

This invention relates to an automatic focusing camera having an automatic distance-measuring and focusing means and more particularly to an automatic focusing camera to which an optical viewfinder system and an optical distance measuring system are arranged separately from an optical photographic taking lens system.

2. Description of the Prior Art

Among the above-mentioned automatic distance-measuring and focusing means (hereinafter called an auto-focus means or an AF means) being used in an automatic focusing camera, a passive AF system means and an active AF system means have generally been used. In the passive AF system, an incident light from a subject is received by a light-receiving element, a distance is measured in a triangular surveying method, and a focus is adjusted according to the corresponding distance measuring signal.

Meanwhile, in an example of the active AF system means, the fundamental pattern is that an infrared ray is emitted from a part of a camera to a subject and the infrared ray reflected therefrom is focused upon condensing on a light-receiving unit so as to read the distance, perceiving that a focused point of the infrared ray deviates a little from the distance to the subject. Such an infrared active AF system as described above is characterized in that an automatic distance measurement is capable even when taking a photograph of a dark subject, though it is somewhat unsatisfactory to focus on the infinity. An ultrasonic projection system is also included in this category of active AF system.

FIGS. 1, 2 are schematic front views, respectively, of a conventional embodiment of the so-called auto-focus camera equipped with an automatic distance-measuring and focusing means of the described active AF system.

In FIG. 1, the described distance-measuring means 3 of active AF system is arranged above taking lens 2 which is located in a predetermined position of camera body 1 and further viewfinder 6 is arranged to the right (or the left) of distance-measuring means 3. Distance-measuring means 3 comprises light-projection means 4 comprising a light-emitting diode and a projection lens and light-receiving means 5 comprising a phototransistor or a photodiode and a condenser lens. By a distance-measured signal generated by this distance-measuring means 3, an electronic or mechanical auto-focus mechanism is operated so as to complete a proper photographing, conjointly with an exposure adjustment.

FIG. 2 illustrates that distance-measuring means 13 equipped with light-projecting means 14 and light-receiving means 15 is arranged vertically to the right side of taking lens 12 of camera body 11 and viewfinder 16 is further arranged to the right-most of the camera body 11. Cameras of this type are characterized in that the size of camera body may be made shorter in height and longer side to side.

In the conventional auto-focus cameras of this kind, the distance between taking lens 2 or 12 and viewfinder 6 or 16 is long and, therefore, the visual field of the taking lens does not coincide with that of the viewfinder, that is, a parallax is caused. Especially in a close-up photography, it must be careful because the parallax will become larger.

FIG. 3 is a schematic diagram of an optical path illustrating the parallax described above. Wherein, E is a distance between taking lens 2 having focal length f and viewfinder 6; and e is a parallax at focused point Q of subject point P at distance l ahead of taking lens 2. Parallax e is indicated by following Formula $$e = \frac{f}{l-f} \cdot E$$

As indicated in the Formula, the greater parallax e is, the longer distance E is or the shorter distance l is. Therefore, when parallax e becomes greater, a subject visible in the visual field of a viewfinder cannot be within the visual field of a taking lens. When taking a photograph with a camera having a great parallax, a part of a subject image is cut out of the print thereof. To avoid this trouble, conventional cameras are so designed as to make the viewfinder visual field 30% to 10% smaller than the picture field taken through a taking lens. However, if the ratio of the viewfinder visual field to the picture field is made excessively smaller, the difference between the viewfinder visual field area and the actual picture frame area becomes greater, that is not desired from the viewpoint of picture composition.

FIG. 4 is a diagram of optical path illustrating the relation between a viewfinder visual field and a picture field taken through a taking lens in the cases of photographing far and near. In this drawing, $P_1$ is a visual field taken through the taking lens when taking picture at a long distance $l_1$; $V_1$ is a viewfinder visual field; $P_2$ is a visual field of the taking lens at close distance $l_2$; and $V_2$ is a viewfinder visual field.

FIGS. 5 (a), 5 (b) illustrate, respectively, the areas on the camera side at a long distance $l_1$ and at close distance $l_2$. FIG. 5 (a) illustrates a superposition of actual picture field $p_1$ on a film to which subject $P_1$ is photographed at a prescribed long distance $l_1$ with viewfinder eyepiece visual field $v_1$ through which viewfinder objective visual field $V_1$. In this state, $p_1$ and $v_1$ have one and the same axis and coincide with each other, therefore, any parallax is not caused. FIG. 5 (b) illustrates a superposition of actual picture frame area $p_2$ when subject $P_2$ is photographed at close distance $l_2$ with viewfinder eyepiece visual field $v_2$. As illustrated in FIG. 5 (b), eyepiece visual field $v_2$ does not meet with actual picture field $p_2$ and a large parallax is therefore caused. In this case, $p_1$ is almost the same as $p_2$.

In the meanwhile, in an automatic focusing camera, an auto-focus frame (hereinafter called an AF frame) is provided to the approximate center of the viewfinder visual field of the camera.

In an active AF system, parallel beams having generally the angles of 3° to 10° of fine infrared rays are projected from the window of a light-projecting means such as an infrared projecting means of a distance-measuring means, and when the beams hit distance-measuring subject area $F_1$ nearly in the center of subject $P_1$, then an invisible bright spot is illuminated. The infrared rays reflected from $F_1$ enter into the window of the light-receiving means of a camera, and an image is formed on the light-receiving spot of a phototransistor or a photodiode through a condenser lens.

When measuring at a given long-distance $l_1$, as shown in FIG. 5 (b), the distance is measured in the center portion $F_1$ of objective visual field $V_1$ because the described AF frame $f_1$ in the viewfinder visual field is provided nearly to the center of eyepiece visual field $v_1$.

Next, when photographing subject $P_2$ at close distance $l_2$, as shown in FIG. 5 (b), eyepiece visual field $v_2$ shifts to the upper left side of the described $v_1$ and AF frame $f_2$ of $v_2$ is accordingly shifted together with the shifting of the center of $v_2$. In other words, when photographing at close distance, a distance is measured in the portion of the shifted objective visual field $F_2$ corresponding to eyepiece visual field $f_2$, but is not measured in the center of an actual picture-taking field corresponding to eyepiece visual field $f_1$. In the drawing, the distance measuring portion overlapped in common by $f_1$, $f_2$ is the small area with oblique lines and the other areas do not meet with each other and cause measurement errors.

The above description relates to the correlative shifts (i.e., a parallaxes between viewfinder eyepiece visual fields $v_1$, $v_2$ and distance-measuring AF frames $f_1$, $f_2$ with respect to actual picture-taking fields $p_1$, $p_2$, respectively, in the case that the optical axis of the viewfinder and that of the distance-measuring projection light are nearly in alignment with each other. However, generally, the optical axis of a viewfinder is separated with an interval from a distance-measuring optical axis. In this case, there still causes a parallax, as described above, because of the difference between the optical axis of the viewfinder and that of the distance-measuring projection light, when at close distance. Even if a photographer aims at a subject and could catch the portion of the subject to be measured in the AF frame of the viewfinder, an infrared projection spot actually hits from a distance-measuring means to a position slightly shifted from the described portion of the subject to be measured because of the parallax, and the distance is measured by receiving the reflected infrared rays from the shifted position. For example, when photographing a subject at close distance after catching the subject in a measuring portion of AF frame, distance-measuring infrared beams reach the background directly, so that the distance-measuring means erroneously judges as if it were a long distance, and the picture comes out of focus.

OBJECTS AND SUMMARY OF THE INVENTION

It is, therefore, an object of the invention to provide an automatic focusing camera capable of wholly solving the following defects having been unsolved in the conventional types of cameras;

(1) A part of an intending photographing field is cut off by getting out of an actual picture field from a viewfinder visual field, because of a parallax between a taking lens and a viewfinder optical system, and (2) Even if the distance-measuring portion of a subject could be caught within an AF frame of a viewfinder, actually, the distance is erroneously measured in a shifted position where is to be out of focus.

This invention provides an automatic focusing camera which comprises a taking lens, an optical viewfinder system, and a distance-measuring means comprising a light-projecting means and a light-receiving means, wherein the optical viewfinder system, the taking lens and the distance-measuring means are arranged adjacent to each other and nearly in alignment with each other.

Because of arranging, in an automatic focusing camera, a taking lens, an optical viewfinder system and a distance-measuring means adjacent to and nearly in alignment with each other, there are, as compared with the conventional cameras, less parallax in the viewfinder and particularly almost no horizontal parallax, and less vignetting of a picture field caused by getting out of an actual picture field from a viewfinder visual field. In addition to the above, because of the almost no distance-measurement parallax in an auto-focus camera of the invention and the distance-measuring means thereof may accurately measure the portion of a subject aimed through an AF frame of the viewfinder, the distance-measurement is highly accurate and the focusing is also accurately operated.

DETAILED DESCRIPTION OF THE INVENTION

Figure 1:
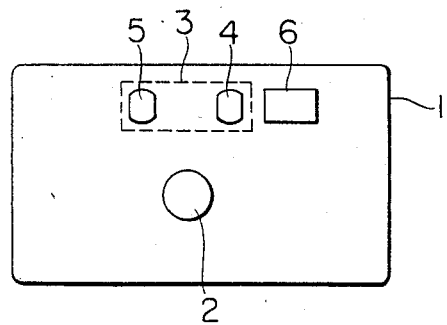
FIGS. 1, 2 are schematic front views, respectively, illustrating conventional types of cameras.
Figure 2:
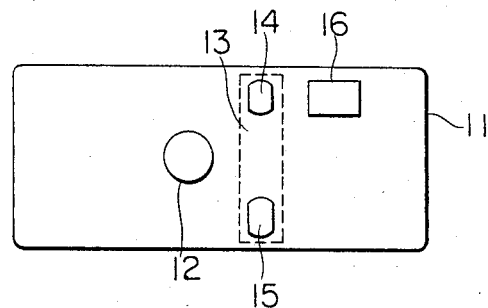
Figure 3:
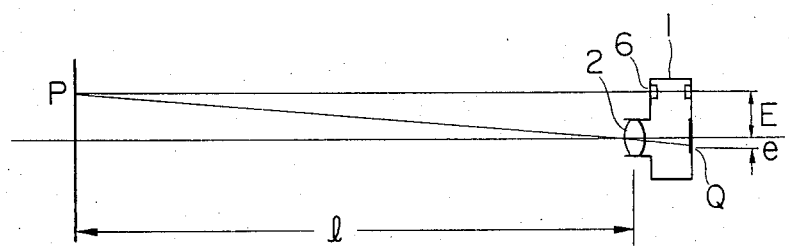
FIG. 3 is a diagram of optical paths illustrating a parallax.
Figure 4:
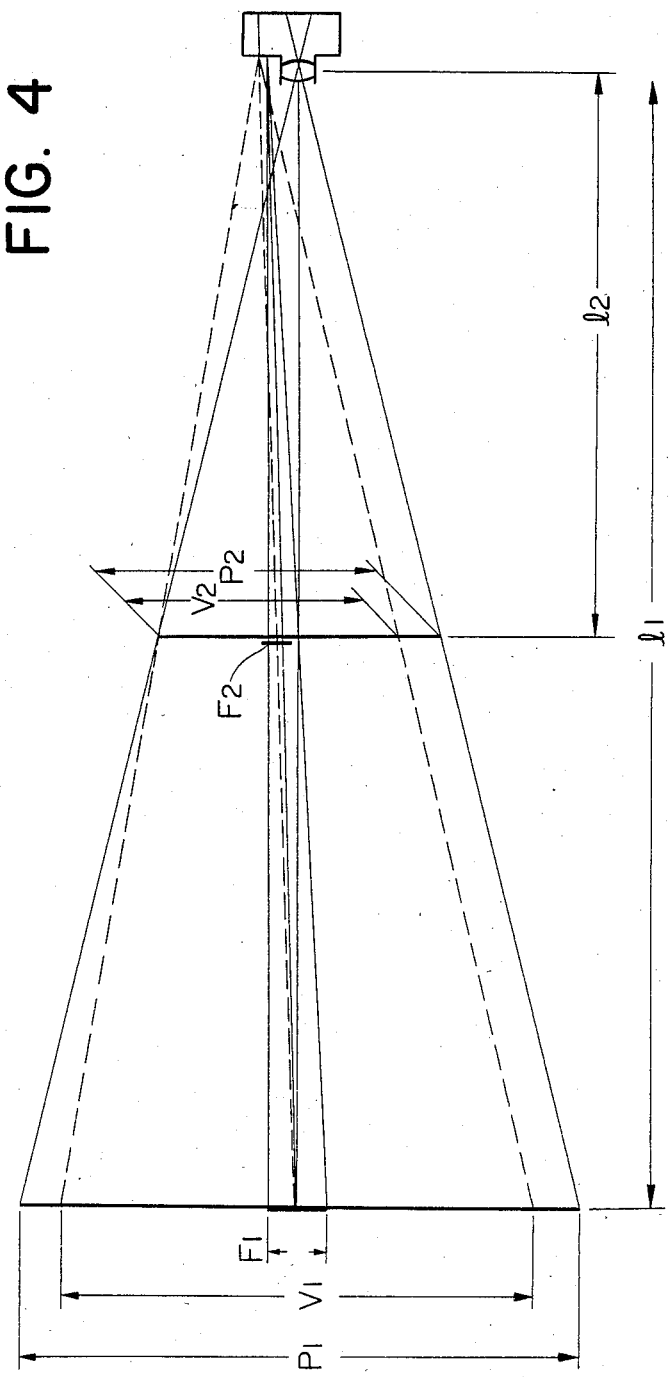
FIG. 4 is a diagram of optical paths illustrating parallaxes, respectively, caused when photographing at a long distance and at close distance.
Figure 5B:
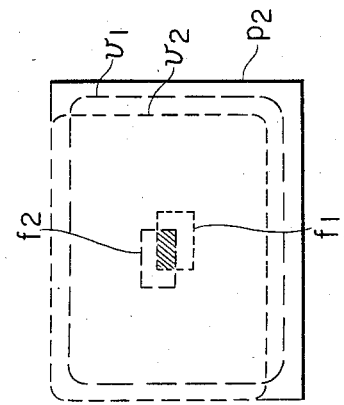
FIGS. 5 (a), 5 (b) are diagrams illustrating the shifts of a viewfinder visual field and an AF frame visual field each when photographing at a long distance and at a close distance, respectively.
Figure 5A:
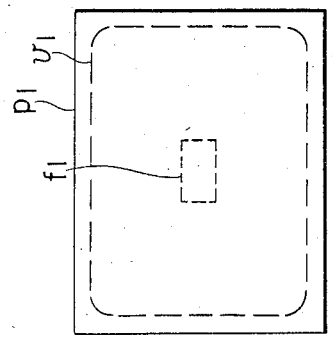
Figure 6:
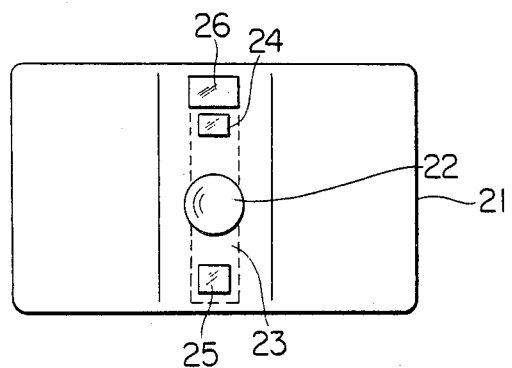
FIG. 6 is a schematic front view of an automatic focusing camera of the invention.

One of the examples of the automatic focusing cameras of the invention will be apparent from the following description taken in connection with the accompanying drawings wherein;

FIG. 6 is a view of the front appearance of an automatic focusing camera of the invention. Taking lens 22 is equipped nearly to the central position of camera body 21 and distance-measuring means 23 are equipped vertically to the both sides of the described taking lens 22. The distance-measuring means 23 are, for example, of an active AF system and each of them comprises light-projecting means 24 and light-receiving means 25. In the automatic focusing cameras of this invention, these distance-measuring means 23 is arranged vertically nearly in alignment with each other to dispose light-projecting means 24 to the upper side of the taking lens 22 and light-receiving means 25 to the lower side thereof. Further, optical viewfinder system 26 is arranged to a position on the nearly upper side of and adjacent to light-projecting means. It is desirable that the above-mentioned optical systems 22, 24, 25, 26 are arranged vertically to be almost in alignment with each other, and that the optical axis of the optical systems each is to be arranged to a point where is within the width twofold broader than the broadest among the widths of the front elements of the optical systems.

Figure 7:
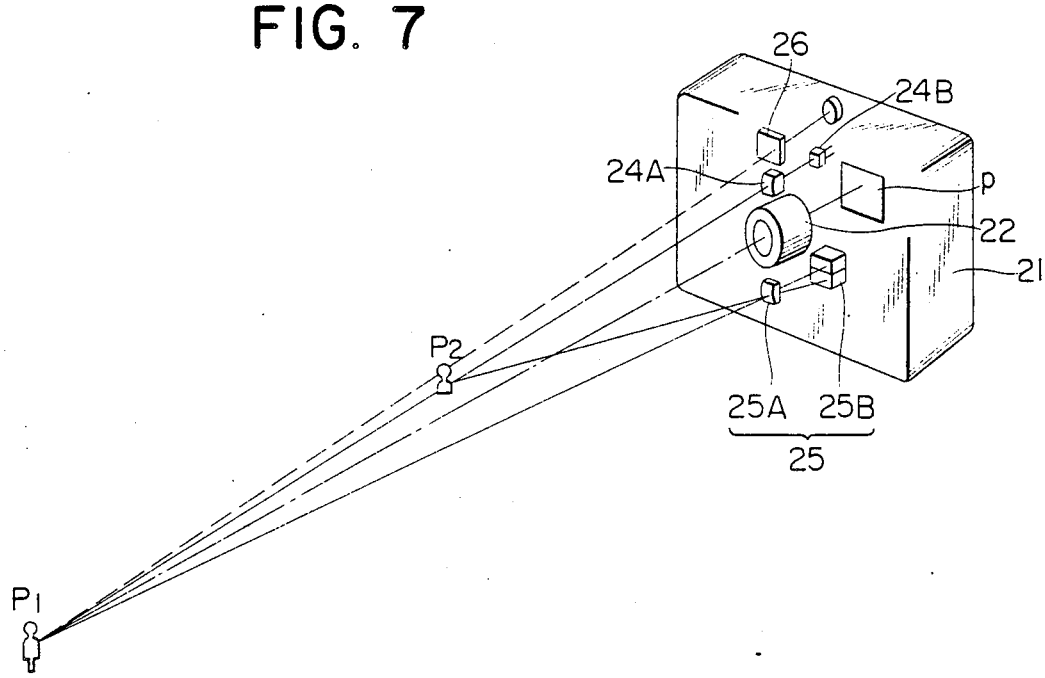
FIG. 7 is a three-dimensional diagram of an optical paths each of an automatic focusing camera of the invention.
Figure 8A:
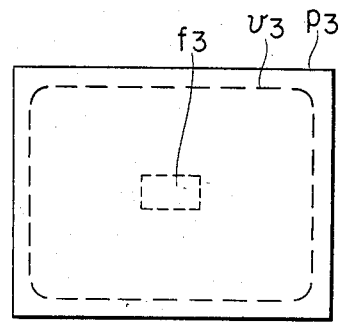
FIGS. 8 (a) through 8 (c). are diagrams respectively illustrating the relation between a viewfinder visual field, an AF frame and an actual picture field, according to the invention.
Figure 8B:
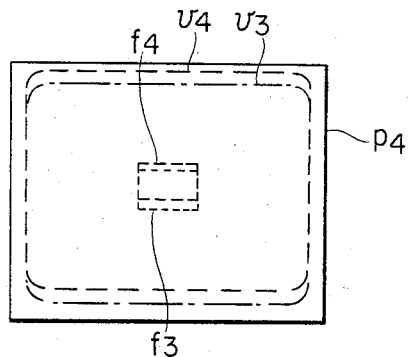
Figure 8C:
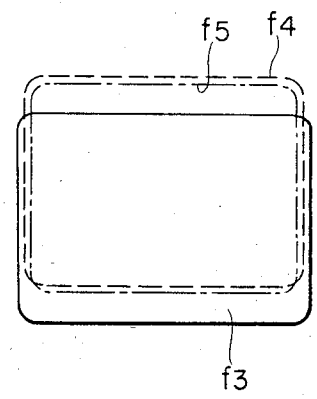

FIG. 7 is a schematic diagram of optical paths illustrating three dimensionally each optical system of an automatic focusing camera of the invention, wherein p is a focal plane obtained through taking lens 22, i.e., a film surface. When a subject is at a given long distance $l_1$, for example, 3 meters, actual picture field $p_3$ of subject $P_1$ through taking lens 22, viewfinder visual field $v_3$ through viewfinder 26, and AF frame $f_3$ for measuring a distance through the viewfinder are so arranged as to be in alignment with one and the same center axis. Such arrangement is shown in FIG. 8 (a).

In this state, infrared beams emitted from infrared ray emitting means 24B of light-projecting means 24, such as an infrared ray emitting diode, are made nearly parallel with an angle of, e.g., 3° to 10° in general, through condenser lens 24A, to irradiate subject $P_1$. The reflected light therefrom is entered into condenser lens 25A and is then brought into focus on the upper element of light-receiving element array 25B for measuring distance.

Next, when photographing subject $P_2$ at close distance $l_2$, and if a distance measuring portion of subject $P_2$ is caught in the described distance measuring frame of a viewfinder, then, as described above, infrared beams emitted from the described infrared ray emitting means 24B hit the distance measuring portion of the subject and a bright infrared spot illuminates though it is invisible by eye. The infrared beams are reflected therefrom to the camera and converged through the described condenser lens 25B to come into focus on the lower element of light-receiving array 25B for measuring a distance. Focal points of infrared beams on the described light-receiving array for measuring a distance differ according to the distance from a subject, and thereby the distance is judged and a focusing is adjusted by moving a taking lens.

When photographing subject $P_2$ at close distance $l_2$ with an automatic focusing camera of the invention in which taking lens 22, optical viewfinder system 26 and light-projecting means 24A of distance-measuring means 24 are so arranged as to be adjacent to and nearly in alignment with each other, a slight parallax will cause, because viewfinder visual field $v_3$ moves upward slightly to $v_4$ corresponding to actual picture field $p_4$ taken through taking lens 22, however the parallax is still within the actual picture field area. Therefore, the subject visible in the viewfinder cannot go out of the actual picture field. There is almost no horizontal parallax, because taking lens 22 and viewfinder 26 are vertically arranged. The correlative positions of such an actual picture field $p_4$ and viewfinder visual field $v_4$ are shown in FIG. 8 (b).

Figure 9:
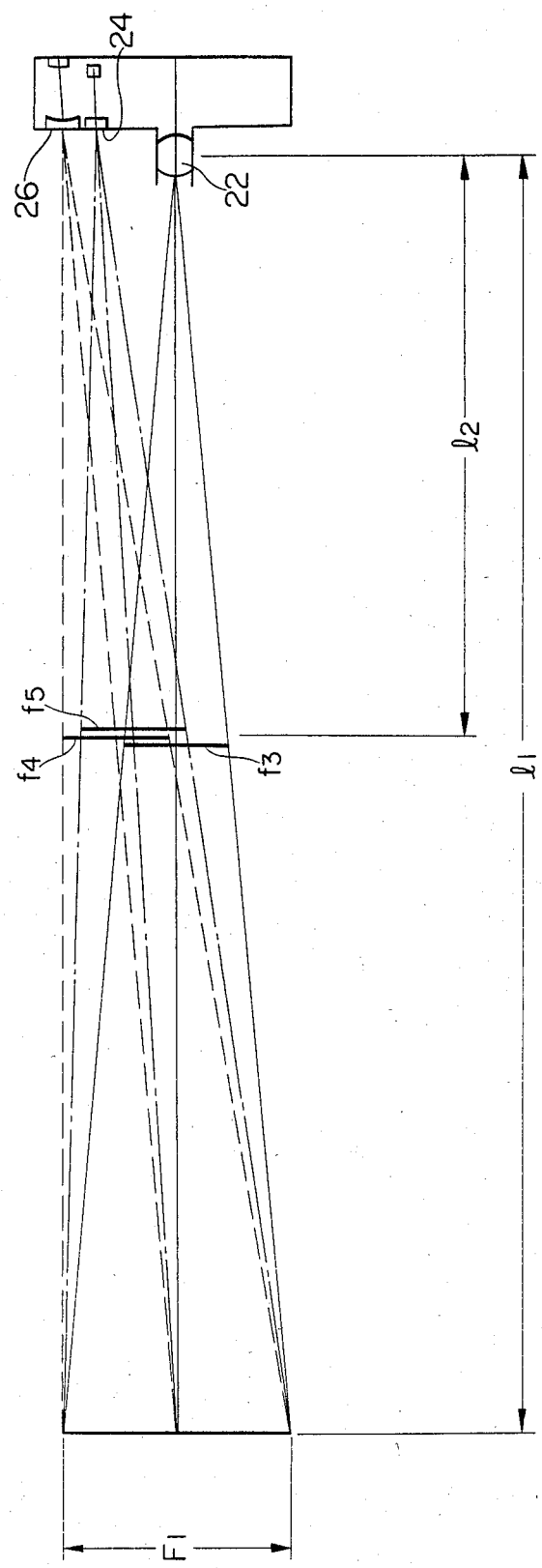
FIG. 9 is a diagram of optical paths illustrating parallaxes caused when measuring distances.

Light-projecting means 24 of distance measuring means 23 is interposed between taking lens 22 and optical viewfinder system 26 and is adjacent-most to the optical viewfinder system. These are arranged nearly in alignment, therefore, the parallax between optical viewfinder system 26 and optical system comprising light-projecting means 24 is a little in the vertical direction, and none at all in the horizontal direction. The reason thereof is that they are provided right under and adjacent to the window of the oblong objective lens of the viewfinder. Accordingly, as shown in FIG. 9, AF frame $f_4$ for measuring distance moves vertically together with viewfinder visual field $v_4$ when photographing at close distance, so that a slight parallax is caused between the AF frame and actual picture field $p_4$. However, parallax is scarcely caused between the distance measuring portion of subject $P_2$ aimed through AF frame f of the viewfinder and spot $f_5$ of subject $P_2$ projected by light-projecting means 24 of a distance measuring means. The described relation thereof is shown in FIG. 8 (c). Thus, an accurate distance can be measured to bring the subject into focus. And, the parallax between a distance measuring visual field and an actual picture field is less than those of conventional type cameras, because light-projecting means 24 is provided between taking lens 22 and optical viewfinder system 26.

Figure 10:
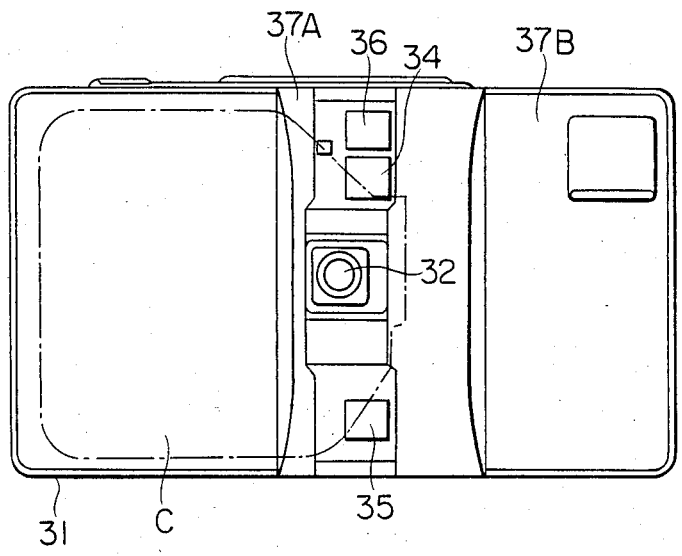
FIGS. 10, 11 are a front view and a perspective view of a disk-camera according to the invention, respectively.

FIG. 10 is a front view of an example of automatic focusing camera using a disk-film cartridge, to which this invention is applied.

Figure 11:
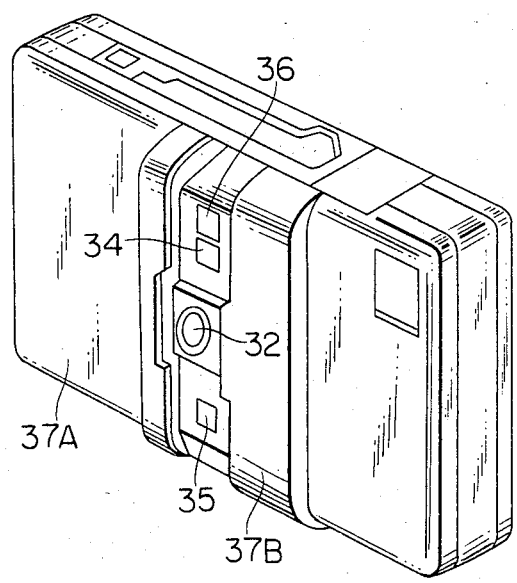

FIG. 11 illustrates a perspective view of the camera shown in FIG. 10.

In the drawings, a disk-shaped film cartridge C indicated by a chain line is loaded inside camera body 31, and the center of a picture area, i.e., an aperture coincides with the optical axis of taking lens 32. A protector is provided in front of the camera body so that taking lens 32 and other optical systems may be protected against dusts. The protector comprises fixed protector 37A on the left thereof and movable protector 37B on the right side. When carrying the camera, movable protector 37B is closed to cover the optical systems and the like, and when photographing movable protector 37B is slided to the right to uncover the taking lens and the optical systems so as to be ready for taking pictures. According to this invention, it is characterized that all of these optical systems, i.e., taking lens 32, light-projecting means 34 for measuring a distance, light-receiving means 35 and optical viewfinder system 36, are so arranged nearly in alignment with each other in the vertical direction. Therefore, the moving distance of movable protector 37B may be short enough to uncover all of the optical systems, e.g., 15 mm at longest. Accordingly, the characters of this invention such as little parallaxes in viewfinder and distance measurement endowed by the whole optical systems arranged in alignment with and adjacent to each other are most suitable for the described protector-covering type disk cameras. In addition, besides the above-mentioned outer-cover-sliding type protectors, it is also allowed to use an inner-cover sliding type protector or a hinge type one.

What is claimed is:

1. An automatic focusing camera, comprising:
   a taking lens;
   distance measuring means comprising a light emitting means and a light receiving means, each of which, and the taking lens, are arranged approximately in alignment;
   a protector means slidable between a first position where the taking lens and the distance measuring means are opened and a second position where the taking lens and the distance measuring means are closed.

2. The automatic focusing camera of claim 1 wherein a sliding direction of the protector means is vertical against the alignment.

3. The automatic focusing camera of claim 1 wherein a leading edge of the protector means, which becomes a leading side when the protector means is closing, is parallel with the alignment.

4. The automatic focusing camera of claim 1 wherein the taking lens is positioned between the light projecting means and the light receiving means.

5. The automatic focusing camera of claim 1 further comprising an optical view finder system arranged in alignment with the taking lens, the light emitting means and the light receiving means.

6. The automatic focusing camera of claim 5 wherein the protector means covers the view finder when it is positioned in the second position.

7. The automatic focusing camera of claim 2 wherein the light emitting means is arranged between the view finder and the taking lens.

8. The automatic focusing camera of claim 3 wherein the light emitting means is arranged adjacent to the view finder.

9. The automatic focusing camera of claim 5 wherein the taking lens, the light emitting means, the light receiving means and the view finder are arranged in a vertical direction against a longitudinal direction of the camera.

10. The automatic focusing camera of claim 5 wherein disk-type photographic film is available in the camera.

* * * * *